United States Patent Office 3,354,100
Patented Nov. 21, 1967

3,354,100
POLYURETHANES PREPARED FROM REACTION PRODUCTS OF POLYOXYALKYLENE POLYOLS AND ORTHOESTERS
William C. Kuryla, St. Albans, W. Va., assignor to Union Carbide Corporation, a corporation of New York
No Drawing. Continuation of abandoned application Ser. No. 292,150, July 1, 1963. This application Oct. 3, 1966, Ser. No. 583,978
2 Claims. (Cl. 260—2.5)

ABSTRACT OF THE DISCLOSURE

There is disclosed urethane polymers prepared by reacting an organic polyisocyanate with the reaction product of a polyoxyalkylene polyol and an orthoester such as ethyl orthoformate.

---

This application is a continuation of application Ser. No. 292,150, filed on July 1, 1963, now abandoned.

The invention relates to a novel class of orthoesters and to certain derivatives thereof. In a particular aspect, the invention relates to polyoxyalkylene esters prepared from orthoesters and to polyurethane derivatives thereof.

The polyoxyalkylene esters of the invention are derived from orthoesters, which are a well known class of compositions. There are several known methods for making orthoesters. One method is to react a trichloride with an alkali metal alkoxide, for instance:

$$R\text{---}CCl_3 + 3NaOR' \rightarrow R\text{---}C(OR')_3 + 3NaCl$$

Another method is to react the hydrochloride salt of an imido ester with an alcohol:

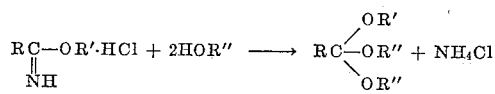

The imido ester starting material can be produced by the reaction:

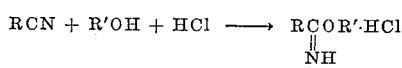

It is seen that a great variety of orthoesters can be used in the invention. The orthoesters that can be used can be represented by the formula:

$$RC(OR^1)_3$$

wherein R is hydrogen or an organic group, and wherein $R^1$ is preferably ethyl but can be any alkyl of up to, for instance, 12 carbon atoms. The R variable is preferably hydrogen, but it can also be any organic group such as alkyl, cycloalkyl, aralkyl, aryl, alkaryl, and the like of up to, for example, 20 carbon atoms and preferably of up to 10 carbon atoms. Illustrative orthoesters include ethyl orthoformate, methyl orthoformate, propyl orthoacetate, butyl orthopropionate, ethyl orthobutyrate, ethyl orthopentanoate, ethyl orthohexanoate, pentyl orthoheptanoate, ethyl orthocyclohexanecarboxylate, ethyl orthobenzoate, ethyl orthophenylacetate, and many others. The ethyl orthoalkanoates are preferred, particularly ethyl orthoformate.

In the preparation of the polyoxyalkylene esters of the invention, an orthoester is reacted with a polyoxyalkylene polyol in the presence of an ester exchange catalyst. In the reaction, one or more of the ester groups of the orthoester are replaced with a polyoxyalkylene group. For instance, in the case where a polyoxyethylene glycol is reacted with ethyl orthoformate, several reactions can occur:

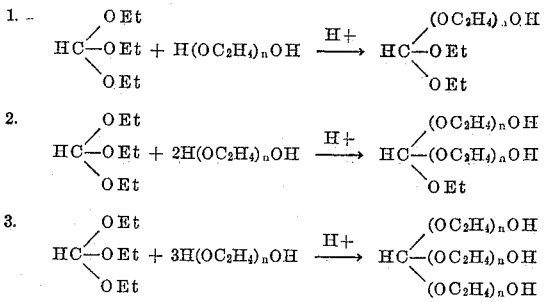

In addition, the polyoxyalkylene polyol can join two orthoesters to produce a composition such as the following

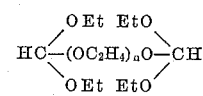

It is apparent from a consideration of the discussion above that the polyoxyalkylene esters of the invention are a complex mixture of many compositions. They can be described as being an ester exchange reaction product of a polyoxyalkylene polyol and an orthoester, preferably an alkyl orthoester. In the ester exchange reaction one or more of the alkyl moieties of the alkyl orthoester is replaced with the residue after removal of a hydroxyl group of a polyoxyalkylene polyol. The polyoxyalkylene polyols used to produce the polyoxyalkylene esters of the invention are polyoxyalkylene glycols, alkylene oxide adducts of polyhydroxyalkanes, alkylene oxide adducts of amines, alkylene oxide adducts of various sugars and sugar derivatives, and the like. The polyoxyalkylene polyols are those wherein the oxyalkylene units have from 2 to 4 carbon atoms such as those derived from ethylene oxide, 1,2-epoxypropane, 1,2-epoxybutane, 2,3-epoxybutane, isobutylene oxide, tetrahydrofuran, and the like. The polyoxyalkylene polyol preferably has from 2 to 8, and more preferably, from 2 to 3 hydroxyl groups. Among the polyoxyalkylene polyols which can be used are polyoxyalkylene glycols such as polyoxyethylene glycol, polyoxypropylene glycol, polyoxy-1,4-butylene glycol, mixed polyoxyethylene-oxypropylene glycols, and the like. Also useful are alkylene oxide adducts of various polyhydroxyalkanes such as ethylene glycol, propylene glycol, glycerol, 1,2,6 - hexanetriol, pentaerythritol, sorbitol, 1,10 - dihydroxydecane, 1,1,1-trimethylolethane, 1,1,1 - trimethylolpropane, and the like. The alkylene oxide adducts of various amines are useful, for instance, methylamine, ethylamine, aniline, ethylene diamine, diethylene triamine, 1,3-propanediamine, 1,3-butanediamine, ammonia, benzenediamine, naphthylamine, naphthalenediamine, and many others. Also useful are the alkylene oxide adducts of non-reducing sugars and non-reducing sugar derivatives such as sucrose, alkyl glycosides such as alpha-methyl glucoside, glycol glycosides such as propylene glycol glucoside, and the like. In general the polyoxyalkylene polyol will have a hydroxyl number of from about 20 to about 800 or more.

The polyoxyalkylene esters of the invention are produced by an ester exchange reaction of an orthoester with a polyoxyalkylene polyol. The ester exchange reaction is carried out by heating a mixture of orthoester, polyoxyalkylene polyol, and acid catalyst. The acid catalysts which can be used include sulfuric acid, para-toluene sulfonic acid, benzene sulfonic acid, methanesulfonic acid, chlorosulfonic acid, boron trifluoride, phosphoric acid, boric acid-oxalic acid mixture, and the like. Sulfuric acid and the various hydrocarbonsulfonic acids are preferred. The catalyst is used in catalytically significant amounts. For example, catalyst quantities of from about 0.0001 mole of acid to 1 mole or more of acid, per mole of orthoester, can be used. Preferred catalyst concentrations are within the range of from about 0.001 mole of acid to about 0.1 mole of acid, per mole of orthoester.

The reaction should be carried out under conditions such that the alcohol moieties of the orthoester reactant are continuously removed from the reaction mixture. For example, where ethyl orthoformate is employed, it may be desirable to carry out the reaction at a temperature above the boiling point of ethanol. If a lower temperature is used, reduced pressure should be employed. Reaction temperatures in the range of 35° C. to 120° C. can be employed, and preferably from about 40° C. to about 100° C. The pressure should be such that the alcohol moieties of the orthoester reactant are removed from the reaction mixture. Thus, atmospheric or subatmospheric pressures (for example, down to 1 or 2 millimeters of mercury, absolute pressure) are preferred.

The reaction time is not narrowly critical. It can vary over a wide range, for instance, from 0.5 hour to 24 hours or more, and preferably from 1 hour to 8 hours. It is particularly desirable to carry out the ester exchange reaction under substantially anhydrous conditions in order to avoid hydrolysis of the ester product. One way of achieving substantially anhydrous conditions is to subject the reaction mixture to a vacuum (e.g., 2–5 millimeters of mercury) for 1 or 2 hours at room temperature, and to maintain the vacuum during the ester exchange reaction. The presence of more than about 1 weight percent water (based on weight of reaction mixture) in the reaction mixture is generally to be avoided.

The proportion of the reactants can vary widely, and is preselected according to the intended use for the polyoxyalkylene ester. For example, if it is desired to produce a product having a large amount of free hydroxyl groups available, an excess of polyoxyalkylene polyol is used. Generally, the reactants are employed in a proportion such that the polyoxyalkylene polyol supplies from about 0.1 to about 10 or more equivalents of hydroxyl per mole of orthoester, and preferably from about 0.5 to about 4 equivalents of hydroxyl per mol of orthoester.

The polyoxyalkylene esters of the invention can be employed in many applications. For instance, they can be used as plasticizers for various thermoplastic polymers, as thickening agents, and the like. The polyoxyalkylene esters of the invention that contain hydroxyl groups can be used as reaction intermediates, for example, they can be esterified with drying oil acids to produce surface coatings, they can be used as hardeners for epoxide resins, and the like.

In a second major aspect, the invention relates to polyurethane compositions which comprise the reaction product of an organic polyisocyanate and a hydroxyl-containing polyoxyalkylene ester of the invention. The polyoxyalkylene esters employed in this connection are those having hydroxyl numbers in the range of from about 20 up to about 700 or more.

In producing the polyurethanes of the invention, it may be desirable to employ one or more additional polyols along with the polyoxyalkylene esters of the invention. A large variety of polyols can be employed for this purpose, for instance, one or more polyols from the following classes of compositions:

(a) Hydroxyl-terminated polyesters and polyester-ethers;
(b) Polyhydroxyalkanes and alkylene oxide adducts thereof;
(c) Trialkanolamines and alkylene oxide adducts thereof;
(d) Alcohols derived from mono- and polyamines by addition of alkylene oxides;
(e) Non-reducing sugars and sugar derivatives and alkylene oxide adducts thereof;
(f) Alkylene oxide adducts of aromatic amine/phenol/aldehyde ternary condensation products;
(g) Alkylene oxide adducts of phosphorus and polyphosphorus acids, and various hydroxyl-terminated phosphites and phosphonates;
(h) Alkylene oxide adducts of polyphenols;
(i) Polytetramethylene glycols, and the like.
(j) Functional glycerides, such as castor oil.

Illustrative hydroxyl-terminated polyesters are those which are prepared by polymerizing a lactone (preferably, an epsilon-caprolactone) in the presence of an active hydrogen-containing starter as disclosed in U.S. Patent 2,914,556. Polyesters from adipic acid and diols such as ethylene glycol, propylene glycol, diethylene glycol, dipropylene glycol, and the like, and triols such as 1,1,1-trimethylolpropane, 1,2,6-hexanetriol, glycerol, and others, are also useful. Copolymers of lactones and alkylene oxides can also be used with good results.

Illustrative polyhydroxyalkanes include, among others ethylene glycol, propylene glycol, 1,3-dihydroxypropane, 1,3-dihydroxybutane, 1,4-dihydroxybutane, 1,4-, 1,5-, and 1,6-dihydroxyhexane, 1,2-, 1,3-, 1,5-, 1,6-, and 1,8-dihydroxyoctane, 1,10-dihydroxydecane, glycerol, 1,2,5-trihydroxybutane, 1,2,6-trihydroxyhexane, 1,1,1-trimethylolethane, 1,1,1-trimethylolpropane, pentaerythritol, xylitol, arabitol, sorbitol, mannitol, and the like. The alkylene oxide adducts of the above-exemplified polyhydroxyalkanes can also be employed, preferably the ethylene oxide, propylene oxide, the epoxybutane, or mixtures thereof, adducts of said polyhydroxyalkanes.

Another useful class of polyols which can be employed are the trialkanolamines and the alkylene oxide adducts thereof. Illustrative trialkanolamines include triethanolamine, triisopropanolamine, and tributanolamine. The alkylene oxide adducts which can be employed are preferably those wherein the oxyalkylene moieties thereof have from 2 to 4 carbon atoms.

Another useful class of polyols which can be employed are the alkylene oxide adducts of mono- and polyamines. The mono- and polyamines are preferably reacted with alkylene oxides having 2 to 4 carbon atoms, for example, ethylene oxide, 1,2-epoxypropane, the epoxybutanes, and mixtures thereof. Mono- and polyamines suitable for reaction with alkylene oxides include, among others, methylamine, ethylamine, isopropylamine, butylamine, benzylamine, aniline, the toluidines, naphthylamines, ethylenediamine, diethylenetriamine, triethylenetetramine, 1,3-butanediamine, 1,3-propanediamine, 1,4-butanediamine, 1, 2-, 1,3-, 1,4-, 1,5-, and 1,6-hexanediamine, phenylenediamines, toluenediamine, naphthalenediamines, and the like. Among the compounds of the above groups which are of particular interest are, among others, N,N,N',N'-tetrakis(2-hydroxyethyl)ethylene-diamine,
N,N,N',N'-tetrakis(2-hydroxypropyl)ethylenediamine,
N,N,N',N'',N''-pentakis(2-hydroxypropyl)diethylenetriamine,
phenyldiisopropanolamine and higher alkylene oxide adducts of aniline, and the like. Others which deserve particular mention are the alkylene oxide adducts of aniline or substituted-aniline/formaldehyde condensation products.

A further class of polyols which can be employed are the non-reducing sugars, the non-reducing sugar derivatives, and more preferably, the alkylene oxide adducts thereof wherein the alkylene oxides have from 2 to 4 carbon atoms. Among the non-reducing sugars and sugar derivatives contemplated are sucrose, alkyl glycosides such as methyl glucoside, ethyl glucoside, and the like, polyol glycosides such as ethylene glycol glucoside, propylene glycol glucoside, glycerol glucoside, 1,2,6-hexanetriol glucoside, and the like.

A still further useful class of polyols are the alkylene oxide adducts of polyphenols wherein the alkylene oxides have from 2 to 4 carbon atoms. Among the polyphenols which are contemplated are found, for example, 2,2 - bis (4 - hydroxyphenyl)propane, bis(4 - hydroxyphenyl)methane, condensation products of phenol and formaldehyde, more particularly the novolac resins, condensation products of various phenolic compounds and acrolein, the simplest members of this class being the 1,1,3 - tris(hydroxyphenyl) propanes, condensation products of various phenolic compounds and glyoxal, glutaraldehyde, and other dialdehydes, the simplest members of this class being the 1,1,2,2 - tetrakis(hydroxyphenyl)ethanes, and the like.

Another desirable class of polyols are the alkylene oxide adducts, preferably the ethylene oxide, 1,2 - epoxypropane, epoxybutane, and mixtures thereof, adducts of aromatic amine/phenol/aldehyde ternary condensation products. The ternary condensation products are prepared by condensing an aromatic amine, for instance aniline, toluidine, or the like, a phenol such as phenol, cresol, or the like, and an aldehyde preferably formaldehyde, at elevated temperatures in the range of, for example, from 60° C. to 180° C. The condensation product is then recovered and reacted with alkylene oxide, using a basic catalyst (e.g., potassium hydroxide) if desired, to produce the polyols. The propylene oxide and mixed propylene-ethylene oxide adducts of aniline/phenol/formaldehyde ternary condensation products deserve particular mention.

The alkylene oxide adducts of phosphorus and polyphosphorus acids are another useful class of polyols. Ethylene oxide, 1,2 - epoxypropane, the epoxybutanes, 3-chloro - 1,2 - epoxypropane, and the like are preferred alkylene oxides. Phosphoric acid, phosphorus acid, the polyphosphoric acids such as tripolyphosphoric acid, and the like are desirable for use in this connection. Also useful are phosphites such as tris(dipropylene glycol) phosphite and the phosphonates which can be produced therefrom by heating in the presence of, e.g., butyl bromide.

Another useful class of polyols are the polytetramethylene glycols, which are prepared by polymerizing tetrahydrofuran in the presence of an acidic catalyst.

Also useful are castor oil and alkylene oxide adducts of castor oil.

The polyol or polyol mixture employed can have hydroxyl numbers which vary over a wide range. In general, the hydroxyl numbers of the polyols employed in the invention can range from about 20, and lower, to about 1000, and higher, preferably, from about 30 to about 600, and more preferably, from about 35 to about 450. The hydroxyl number is defined as the number of milligrams of potassium hydroxide required for the complete neutralization of the hydrolysis product of the fully acetylated derivative prepared from 1 gram of polyol. The hydroxyl number can also be defined by the equation:

$$OH = \frac{56.1 \times 1000 \times f}{M.W.}$$

where
OH = hydroxyl number of the polyol
$f$ = average functionality, that is, average number of hydroxyl groups per molecule of polyol
M.W. = average molecular weight of the polyol.

The exact polyol employed depends upon the end-use of the polyurethane product. For example, when used to prepare foams, the molecular weight and the hydroxyl number are selected properly to result in flexible, semi-flexible, or rigid foams. The above polyols preferably possess a hydroxyl number of from about 200 to about 1000 when employed in rigid foam formulations, from about 50 to about 250 for semi-flexible foams, and from about 20 to about 70 or more when employed in flexible foam formulations. Such limits are not intended to be restrictive, but are merely illustrative of the large number of possible combinations of the above polyol coreactants.

A large variety of organic polyisocyanates and polyisothiocyanates are known in the art to be useful in the production of polyurethanes. For example, preferred isocyanates are polyisocyanates and polyisothiocyanates of the general formula:

$$(RNCG)_x$$

wherein G is oxygen or sulfur, $x$ is an integer of two or more and R is an alkylene, substituted alkylene, arylene or substituted arylene radical, a hydrocarbon, or substituted hydrocarbon containing one or more aryl —NCG bonds and one or more alkyl —NCG bonds. R can also include radicals such as —RZR— where Z may be a divalent moiety such as —O—, —O—R—O—, —CO—, —CO$_2$—, —S—, —S—R—S—, —SO$_2$—, etc. Examples of such compounds include hexamethylene diisocyanate, xylylene diisocyanates, (OCNCH$_2$CH$_2$OCH$_2$)$_2$, 1-methyl - 2,4 - diisocyanatocyclohexane, phenylene diisocyanate, 2,4 -, and 2,6 - tolylene diisocyanates, chlorophenylene diisocyanates, diphenylmethane - 4,4' - diisocyanate, naphthalene - 1,5 - diisocyanate, triphenylmethane - 4,4',4" - triisocyanate, xylene - α,α' - diisothiocyanate, and isopropylbenzene - α,4 - diisocyanate.

Further included are dimers and trimers of isocyanates and diisocyanates and polymeric diisocyanates of the general formulae:

$$(RNCG)_x \text{ and } [R(NCG)_x]_y$$

in which $x$ and $y$ are two or more, as well as compounds of the general formula:

$$M(NCG)_x$$

in which $x$ is two or more and M is a monofunctional or polyfunctional atom or group. Examples of this type include ethylphosphonic diisocyanate, (C$_2$H$_5$P(O)(NCO)$_2$; phenylphosphonic diisocyanate, C$_6$H$_5$P(NCO)$_2$; compounds containing a —Si—NCG group, isocyanates derived from sulfonamides R(SO$_2$NCO)$_x$, and the like.

Additional useful polyisocyanates are disclosed in an article by Siefken, Annalen der Chemie 562, pages 122–135 (1949).

The polyurethane products of the invention can take the form of foamed products, elastomers, surface coatings, castings, and the like. The foamed products can be produced, for example, by the one-shot technique wherein all of the reactants are reacted simultaneously with the foaming operation. Also, the quasi-prepolymer technique can be used to produce foams. In this technique, the isocyanate is first reacted with a portion of the polyol to give a product having a high percentage of free —NCO groups (e.g., from 20 to 50 percent), and this product is subsequently foamed by reaction with polyol and foaming agent. In producing elastomers, the prepolymer technique is useful. In the prepolymer technique, the isocyanate is reacted with a slightly less than stoichiometric quantity of polyol to produce a prepolymer having a low percentage (e.g., from 1 to 10 percent) of free —NCO groups. The prepolymer is subsequently converted into an elastomer by reacting with a cross-linking agent having reactive hydrogen atoms such as a diamine, for instance, a bis(aminochlorophenyl)methane. In producing surface coatings, there are several types of known reaction techniques which can be employed. The following are representative:

(1) Use of a prepolymer having a low percentage of free —NCO that is cured by atmospheric moisture;

(2) A two-component system in which a prepolymer is mixed with a polyol just before application;

(3) A one-package system comprising two ingredients and requiring a heat cure. One of the ingredients is a polyisocyanate prepolymer in which the free —NCO groups have been blocked (e.g., with phenol) to make the isocyanate groups non-reactive until unblocked by heat. The second ingredient is a polyol.

(4) A one-component system containing no free isocyanate.

Unsaturated fatty acid diglycerides are reacted with polyisocyanate to cross-link the ester chains. Cure occurs through conventional oxidative drying of the fatty acid chains. Castable polyurethanes are produced by techniques similar to those used to produce elastomers. Each of the above-discussed techniques is known in the art. It is again pointed out that the utility of the polyamines and polyisocyanates of the invention in producing polyurethane products is greatly enhanced by the lower melting points and viscosities of these materials than was heretofore obtainable with polyamine and polyisocyanate products of comparable molecular weight.

The amount of polyisocyanate employed will vary slightly depending upon the nature of the polyurethane being prepared. In general the total —NCO equivalent to total active hydrogen equivalent (i.e., hydroxyl plus water, if water is present) should be such as to provide a ratio of 0.8 to 1.2 equivalents of —NCO per equivalent of active hydrogen, and preferably a ratio of about 1.0 to 1.1 equivalents of —NCO per reactive hydrogen.

When foams are being produced, foaming can be accomplished by employing a small amount of water in the reaction mixture (for example, from about 0.5 to 5 weight percent of water, based on total weight of the reaction mixture), or through the use of blowing agents which are vaporized by the exotherm of the isocyanate-reactive hydrogen reaction, or by a combination of the two methods. All of these methods are known in the art. The preferred blowing agents are water and certain halogen-substituted aliphatic hydrocarbon which have boiling points between about —40° C. and 70° C., and which vaporize at or below the temperature of the foaming mass. Illustrative are, for example, trichloromonofluoromethane, dichlorodifluoromethane, dichloromonofluoromethane, dichloromethane, trichloromethane, bromotrifluoromethane, chlorodifluoromethane, chloromethane, 1,1-dichloro-1-fluoroethane, 1,1-difluoro-1,2,2-trichloroethane, chloropentafluoroethane, 1-chloro-1-fluoroethane, 1-chloro-2-fluoroethane, 1,1,2-trichloro-1,2,2-trifluoroethane, 1,1,1-trichloro-2,2,2-trifluoroethane, 2-chloro-1,1,1,2,3,3,4,4,4-nonafluorobutane, hexafluorocyclobutene, and octafluorocyclobutane. Other useful blowing agents include low-boiling hydrocarbons such as butane, pentane, hexane, cyclohexane, and the like. Many other compounds easily volatilized by the exotherm of the isocyanate-reactive hydrogen reaction also can be employed. A further class of blowing agents includes thermally-unstable compounds which liberate gases upon heating, such as N,N'-dimethyl-dinitrosoterephthalamide.

The amount of blowing agent used will vary with the density desired in the foamed product. In general it may be stated that for 100 grams of reaction mixture containing an average isocyanate/reactive hydrogen ratio of about 1:1, about 0.005 to 0.3 mole of gas are used to provide densities ranging from 30 to 1 pounds per cubic foot respectively.

Catalysts can be employed in the reaction mixture for accelerating the isocyanate-reactive hydrogen reaction. Such catalysts include a wide variety of compounds such as, for example:

(a) Tertiary amines such as trimethylamine, triethylamine, N-methylmorpholine, N-ethylmorpholine, N,N-dimethylbenzylamine, N,N-dimethylethanolamine, N,N,N',N'-tetramethyl-1,3-butanediamine, triethanolamine, 1,4-diazabicyclo[2.2.2]octane, 1,2,4-trimethylpiperazine, bis(dimethylaminomethyl)amine, N,N,N',N'-tetraalkyl-1,3-propanediamine, and the like;

(b) Tertiary phosphines such as trialkylphosphines, dialkylbenzylphosphines, and the like;

(c) Strong bases such as alkali and alkaline earth metal hydroxides, alkoxides, and phenoxides;

(d) Acidic metal salts of strong acids such as ferric chloride, stannic chloride, stannous chloride, antimony trichloride, bismuth nitrate and chloride, and the like;

(e) Chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis-acetylacetonealkylenediimines, salicylaldehydeimine, and the like, with various metals such as Be, Mg, Zn, Cd, Pb, Ti, Zr, Sn, As, Bi, Cr, Mo, Mn, Fe, Co, Ni, or such ions as $MoO_2^{++}$, $UO_2^{++}$, and the like;

(f) Alcoholates and phenolates of various metals such as $Ti(OR)_4$, $Sn(OR)_4$, $Sn(OR)_2$, $Al(OR)_3$, and the like, wherein R is alkyl or aryl, and the reaction products of alcoholates with carboxylic acids, beta-diketones, and 2-(N,N-dialkylamino)-alkanols, such as the well known chelates of titanium obtained by said or equivalent procedures;

(g) Salts of organic acids with a variety of metals such as alkali metals, alkaline earth metals, Al, Sn, Pb, Sb, Mn, Co, Ni, and Cu, including, for example, sodium acetate, potassium laurate, calcium hexanoate, stannous acetate, stannous octoate, stannous oleate, lead octoate, metallic driers such as manganese and cobalt naphthenate, and the like;

(h) Organometallic derivatives of tetravalent tin, trivalent and pentavalent As, Sb, and Bi, and metal carbonyls of iron and cobalt. Among the organotin compounds that deserve particular mention are dialkyltin salts of carboxylic acids, e.g., dibutyltin diacetate, dibutyltin dilaurate, dibutyltin maleate, dilauryltin diacetate, dioctyltin diacetate, dibutyltin-bis(4-methylaminobenzoate), dibutyltin-bis-(6-methylaminocaproate), acetate, dioctyltin diacetate, dibutyltin-bis(4-methyl- and the like. Similarly there may be used a trialkyltin hydroxide, dialkyltin oxide, dialkyltin dialkoxide, or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin-bis(isopropoxide), dibutyltin-bis(2-dimethylaminopentylate), dibutyltin dichloride, dioctyltin dichloride, and the like.

The tertiary amines may be used as primary catalysts for accelerating the reactive hydrogen/isocyanate reaction or as secondary catalysts in combination with one or more of the above-noted metal catalysts. Metal catalysts, or combinations of metal catalysts, may also be employed as the accelerating agents, without the use of amines. The tin catalysts are the preferred metal catalysts. The catalysts are employed in small amounts, for example, from about 0.001 percent to about 5 percent, based on weight of the reaction mixture.

In producing foamed reaction products, it is also within the scope of the invention to employ small amounts, e.g., about 0.001% to 5.0% by weight on the total reaction mixture, of an emulsifying agent such as a polysiloxane-polyoxalkylene block copolymer having from about 10 to 80 percent by weight of siloxane polymer and from 90 to 20 percent by weight of alkylene oxide polymer, such as the block copolymers described in U.S. Patents 2,834,748 and 2,917,480. Another useful class of emulsifiers are the "non-hydrolyzable" polysiloxane-polyoxyalkylene block copolymers. This class of compounds differs from the above-mentioned polysiloxane-polyoxyalkylene block copolymers in that the polysiloxane moiety is bonded to the polyoxyalkylene moiety through direct carbon-to-silicon bonds, rather than through carbon-to-oxygen-to-silicon bonds. These copolymers generally contain from 5 to 95 percent, and preferably from 5 to 50 weight percent, of polysiloxane polymer with the remainder being polyoxyalkylene polymer. The copolymers can be prepared, for example, by heating a mixture of (a) a polysiloxane polymer containing a silicon-bonded, halogen-substituted monovalent hydrocarbon group, and (b) an alkali metal salt of a polyoxyalkylene polymer, to a temperature sufficient to cause the polysiloxane polymer and the salt to react to form the block copolymer. Other useful emulsifiers include such materials as polyethoxylated vegetable oils. Although the use of an emulsifier is desirable to influence the type of foam structure that is formed, the foam products of the invention can be prepared without emulsifiers in some cases.

The polyurethanes of the invention are highly useful compositions. For example, the foams can be used in insulating applications, as padding and cushions, and the like. The elastomers can be used as gasketing materials, for instance, as clay pipe sealers. The surface coatings can be used to coat metallic, wooden, glass, and the like, objects. Castable polyurethanes can be used in encapsulation of electrical parts, in making molded articles, and the like.

Orthoesters are highly susceptible to hydrolysis in the presence of acid. For this reason, a polyurethane foam prepared from a polyoxyalkylene orthoester can be treated with aqueous acid (e.g., sulfuric acid) to dissolve the thin wall membranes within the internal foam structure. This leaves a structure having particular utility as a filter for gases or liquids. Also, certain of the polyurethane foams of the invention are frangible and therefore can be used as "one-shot" shock absorbing material, for example, to protect packages intended for delivery by the air-drop technique that is used by the armed forces.

The examples which follow illustrate various aspects of the invention.

EXAMPLE 1

*Product formed by the reaction of polyoxypropylene glycol (M.W.—2025) with ethyl orthoformate, using p-toluene sulfonic acid as a catalyst*

Polyoxypropylene glycol (M.W.—2025, 2025 g., 1.00 mole) triethyl orthoformate (149 g., 1.00 mole), and p-toluene sulfonic acid (5.00 g., 0.026 mole) were charged to a 3 l. flask. This mixture was then stirred at room temperature for about 2 hours at a pressure of 2–5 mm. whereupon solution was effected. The solution was then allowed to keep at room temperature for a period of 48 hours (over the weekend). The solution was then slowly heated to 80° C., with stirring and vacuum (2–5 mm.) over a 5 hour period, to give a straw yellow viscous oil as the residue product.

EXAMPLE 2

*The polyurethane foam of the polyol of Example 1*

The following polyurethane foam formulation was used for the foaming of the polyol described in Example 1:

| | |
|---|---|
| Stannous octoate _____g__ | 0.30 |
| Silicone oil [1] _____g__ | 1.00 |
| Tolylene diisocyanate, excess percent _____ | 3 |
| N,N,N',N'-tetramethyl-1,4-butanediamine ____g__ | 0.10 |
| Water _____g__ | 3.50 |
| Polyol of Example 1 _____g__ | 100.0 |

[1] A composition of the formula:

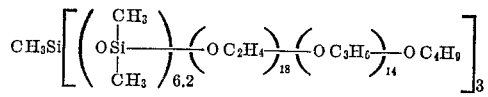

The polyol of Example 1 gave a quite unusual polyurethane foam. The foam was semi-rigid, having very little tear strength or resilience. Compression of the foam produced a crumbly powder. Such a foam has utility in shock absorbing applications.

EXAMPLE 3

*Product formed by the reaction of polyoxypropylene glycol (M.W.—1025) with ethyl orthoformate*

Polyoxypropylene glycol (M.W.—1025, 3075 g., 3.00 mole), triethyl orthoformate (150 g., 1.00 mole), and p-toluene sulfonic acid (5.00 g., 0.026 mole) were charged to a 5 l. flask. This mixture was then stirred and slowly heated to 55° C. under vacuum (4 mm.) for 6 hours. A total of 100 g. of distillate was collected in the Dry-Ice traps. The residue product was pale yellow in color, having a viscosity of 1460 cps. at 25° C. The average hydroxyl number was 81.5.

EXAMPLE 4

*Product formed by the reaction of poly-1,4-butylene glycol (M.W.—3000) with ethyl orthoformate*

Poly-1,4-butylene glycol (M.W.—3000, 3000 g., 1.00 mole) triethyl orthoformate (150 g., 1.00 mole), and p-toluene sulfonic acid (5.00 g., 0.026 mole) were charged to a 5 l. flask. The stirred reaction mixture was heated to about 60° C., and vacuum (2–5 mm.) was applied while the temperature of the reactants slowly dropped to 45° C. over a 4 hour period. A total of 105 g. of distillate was collected in the Dry-Ice traps, leaving a jelly-like rubbery residue product. The product was quite elastomeric when warm, but solidified into a waxy colorless mass upon long standing at room temperature. The average hydroxyl number of this product was 23.2.

EXAMPLE 5

*Use of the product of Example 4 as a thickening agent, and the making of a polyurethane foam from a thickened polyol*

The product described in Example 4 (E-4) has utility as a thickening agent for other polyols. The table below illustrates its utility in propylene oxide adduct of glycerine having an average hydroxyl number of 56.

| No. | Polyol | Viscosity (cps.) at 25° C. | Polyol Appearance |
|---|---|---|---|
| A | 100% | 490 | Clear. |
| B | 1% E-4 | 550 | Do. |
| C | {99% Polyol<br>{5% E-4<br>{95% Polyol | 4,200 | Milky. |

A sample of the propylene oxide adduct of glycerol (OH number—56) containing 2.5% by weight of the product described in Example 4 was foamed using the formulation given in Example 2. The physical data of the polyurethane foam produced, together with a control (100% polyol) are given below.

| Foam | 4 in. I.L.D. (lbs./50 in.²) | | | 4" SAC Factor | Flex Fatigue (Percent lb. Loss) |
|---|---|---|---|---|---|
| | 25% | 50% | 65% | | |
| 2.5% E-4 | 31.0 | 51.4 | 70.5 | 2.3 | 12.9 |
| Control | 40.5 | 59.0 | 79.1 | 2.0 | 20.0 |

Note the marked improvement in the flex fatigue (percent load loss), and the increased value for the SAC factor in the foam containing the thickener.

EXAMPLE 6

*Product formed by the reaction of polyoxyethylene glycol (M.W.—400) with ethyl orthoformate*

Polyoxyethylene glycol (M.W.—400, 1200 g., 3.00 mole), triethyl orthoformate (150 g., 1.00 mole), and p-toluene sulfonic acid (5.00 g., 0.026 mole) were charged to a 2 l. flask. This mixture was then stirred at 2–5 mm. pressure for a period of 4 hours and at a maximum temperature of 45° C. A total of 131 g. of distillate was collected in the Dry-Ice traps to give a straw-yellow colored liquid as the residue product. This yellow product had a viscosity of 550 cps. at 25° C., and an average hydroxyl number of 173.8.

EXAMPLE 7

*Product formed by the reaction of a triol with ethyl orthoformate*

A triol by the reaction of 1,2-propylene oxide with glycerine to an average hydroxyl number of 56 (3000 g., 1.00 mole), triethyl orthoformate (150 g., 1.00 mole), and p-toluene sulfonic acid (5.00 g., 0.026 mole) were charged to a 3 l. flask. This mixture was then stirred at 2–5 mm. pressure for a period of 4 hours at a maximum temperature of 40–45° C. The temperature was then raised to 60–70° C. for 1 hour, and the distillate (95 g.) collected in the Dry-Ice traps. The residue product was light tan liquid, having a viscosity of 2400 cps. at 25° C. The average hydroxyl number was 37.1.

EXAMPLE 8

*Product formed by the reaction of polyoxypropylene glycol (M.W.—2025) with ethyl orthoformate, using sulfuric acid as a catalyst*

Polyoxypropylene glycol (M.W.—2025, 2000 g., 1.00 mole), triethyl orthoformate (150 g., 1.00 mole) and concentrated sulfuric acid (0.50 ml.) were charged to a 3 l. flask. This mixture was then heated to 105° C. at 2–5 mm. pressure, over a 4 hour period. A total of 116 g. of distillate was collected, to give a very viscous straw-yellow liquid. The viscosity of this product was 72,000 cps. at 25° C., and the average hydroxyl number was 20.8.

EXAMPLE 9

*Heating of polyoxypropylene glycol-2025 with p-toluene sulfonic acid*

In an effort to demonstrate that an orthoester was reacting with the polyol in question, the following reaction was run.

Polyoxypropylene glycol (M.W.—2025, 1000 g., 0.50 mole) and p-toluene sulfonic acid (5.00 g., 0.026 mole) were placed in a 2 l. flask. This mixture was then heated, with stirring and at a pressure of 2–5 mm., to a temperature of 85° C. for a period of 8 hours. There was *very* little distillate collected in the Dry-Ice traps (est. ca. 1 g.). The reaction mixture darkened to a straw-yellow color by this treatment. The viscosity of the above residue yellow liquid was 380 cps. at 25° C., and the average hydroxyl number was 53.8. In comparison, the hydroxyl number of the polyoxypropylene glycol-2025 starting material was 56.4, and the viscosity of this material was 350 cps. at 25° C.

What is claimed is:

1. A polyurethane prepared by reacting:
   (a) an organic polyisocyanate, and
   (b) an ester exchange reaction product having a hydroxyl number in the range of about 20–700 prepared by reacting in the presence of an acid catalyst at a temperature of about 35°–120° C. for about 0.5–24 hours:
      (i) a polyoxyalkylene polyol having from 2 to 8 hydroxyl groups wherein the oxyalkylene groups thereof have from 2 to 4 carbons atoms, and,
      (ii) an orthoester of the formula:

$$RC(OR^1)_3$$

wherein R represents hydrogen or a radical having up to 20 carbon atoms selected from the group consisting of alkyl, cycloalkyl, aralkyl, aryl, and alkaryl, and wherein $R^1$ represents an alkyl radical of up to 12 carbon atoms.

2. The polyurethane of claim 1 wherein said polyurethane is a polyurethane foam prepared by reacting in the presence of a catalyst and blowing agent:
   (A) an organic polyisocyanate, and
   (B) an ester exchange reaction product having a hydroxyl number in the range of about 20–700 prepared by reacting in the presence of an acid catalyst at a temperature of about 35–120° C. for about 0.5–24 hours:
      (i) a polyoxalykylene polyol having from 2 to 8 hydroxyl groups wherein the oxyalkylene groups thereof have from 2 to 4 carbon atoms, said polyol being selected from the group consisting of:
         (a) polyoxyalkylene glycols,
         (b) alkylene oxide adducts of polyhydroxyalkanes,
         (c) alkylene oxide adducts of amines, and
         (d) alkylene oxide adducts of non-reducing sugars and sugar derivatives, and,
      (ii) a trialkyl orthoalkanoate wherein the alkyl group contains up to 20 carbon atoms.

References Cited

UNITED STATES PATENTS

| | | | |
|---|---|---|---|
| 3,037,946 | 6/1962 | Guest et al. | 260—2.5 |
| 3,049,515 | 8/1962 | Damusis | 260—77.5 |
| 3,255,253 | 6/1966 | Kuryla | 260—584 |
| 3,267,050 | 8/1966 | Kuryla et al. | 260—2.5 |

FOREIGN PATENTS 1,308,287  9/1962  France.

DONALD E. CZAJA, *Primary Examiner.*

F. M. McKELVEY, *Assistant Examiner.*